Nov. 17, 1942.  P. SCHNECK  2,302,263
METHOD OF MAKING STUD LINKS
Filed May 28, 1942
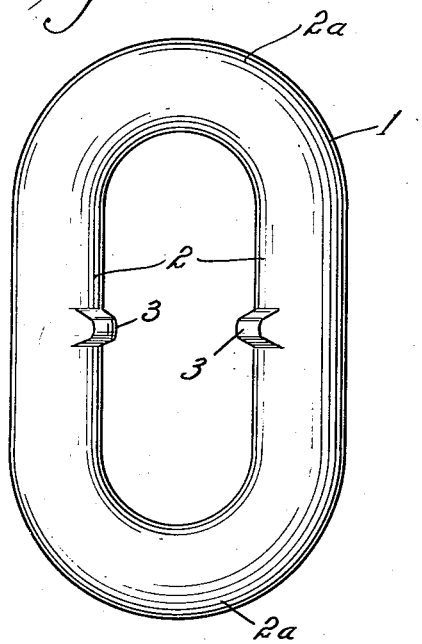
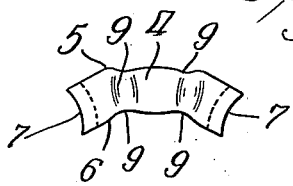
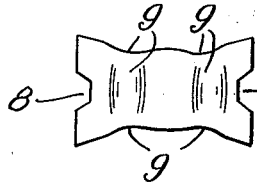
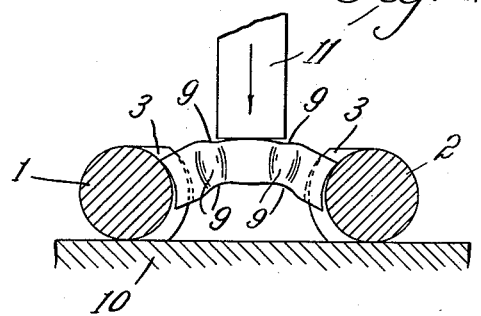
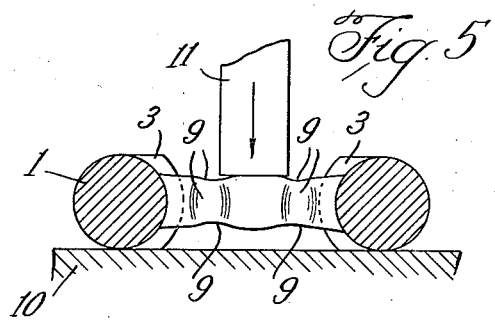
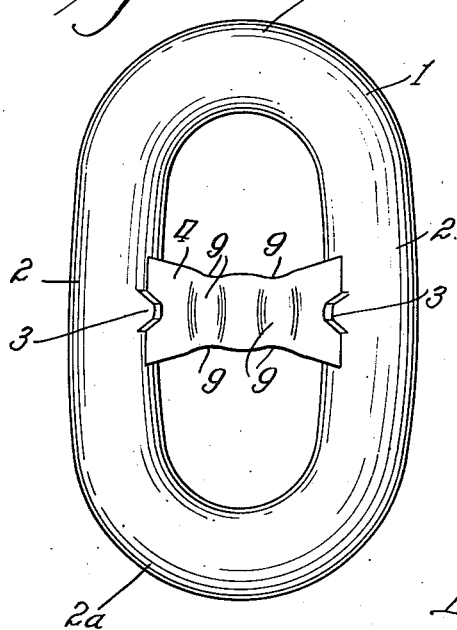
Inventor:
Philip Schneck
By:- Barnett + Truman
Att'ys Patented Nov. 17, 1942

2,302,263

UNITED STATES PATENT OFFICE 2,302,263

METHOD OF MAKING STUD LINKS

Philip Schneck, Hammond, Ind., assignor to S. G. Taylor Chain Company, Hammond, Ind., a corporation of Illinois Application May 28, 1942, Serial No. 444,817

10 Claims. (Cl. 59—35)

This invention is directed to new and useful improvements in Method of making stud links and more particularly to the method of securing a stud in position in a chain link.

A stud link is a link having a stud or cross bar positioned across the width of the link to divide it into two parts so that when the link is joined with other links to form a chain the stud will prevent kinking of the chain.

In practicing this invention the links are generally formed in accordance with the method shown and described in Taylor Patent No. 2,144,319, dated January 17, 1939, and the welds or fins are then trimmed as shown and described in Taylor and Peterson Patent No. 2,125,967, dated August 9, 1938, so that each link of the chain has two opposed fin portions on the inside surface of the link.

However the links may be formed by other methods by which the finished links are provided with opposed fins or projecting portions on their inner surfaces.

The primary object of this invention is to provide a new and useful method of making stud links of the links having the said characteristics.

A further object is to provide a simple method of securing stud portions to links when the links and stud portions are cold.

Still a further object is to provide a method of uniting stud members with chain links so that they will at all times be held in position.

Other objects and advantages will be apparent from the following detailed description.

In the drawing Fig. 1 is a plan view of a link of the type referred to and to which a stud member is to be secured.

Fig. 2 is a side elevation of a stud member shaped to be secured to the link shown in Fig. 1.

Fig. 3 is a plan view of the stud member shown in Fig. 2.

Fig. 4 is a central sectional view of the link shown in Fig. 1 with the stud member in initial position.

Fig. 5 is a similar view to Fig. 4 but showing the stud member secured to the link.

Fig. 6 is a plan view of the link with the stud in secured position.

In detail, the link is shown at 1 having the usual parallel side portions 2 and curved connecting end portions 2a, the inner surfaces of the opposite side portions 2 being provided with opposing projections or fins 3.

The stud member 4 is forged or formed in some manner so as to have a bowed or curved conformation having a convex upper surface 5 and a concave lower surface 6. The surfaces of the ends are curved concavely as at 7 to form jaws to fit the inner curved surfaces of the opposite side portions 2 of the link and the ends are grooved at 8 to fit around the fins 3. The distance between the ends of the stud adjacent the upper surface 5 is greater than the distance between the inner sides 2 of the link and the distance between the end portions of the stud adjacent the lower surface 6 is less than the distance between the said sides so that the bowed stud member can be initially positioned across the link as shown in Fig. 4. Adjacent each end the stud member 4 is formed of less cross section area than the intermediate and end portions, as shown at 9, for the purpose hereinafter described. These weakened portions 9, as shown in the drawing, are somewhat exaggerated for purposes of demonstration for in actual practice these weakened portions will be less apparent.

Stud member 4 is formed of such dimension that when straightened from bowed conformation to the shape shown in Fig. 5, the distance between the innermost portions of the concave surfaces 7 of the ends will be slightly greater than the distance between the opposite inner surfaces of the side portions 2 of the link 1.

To practice the method both the link 1 and the stud member 4 are first formed as shown and then allowed to become cold. One advantage of this is that the handling of the parts is greatly facilitated while also the parts are more securely joined together.

The link 1 is then positioned on a support 10 below a downwardly movable die or press member 11 and the stud member 4 is positioned on and across the link 1 as shown in Fig. 4 with grooves 8 aligned with fins or projections 3. Member 11 is then moved downwardly under great pressure, for example about twenty tons in the case of a stud member of about one inch in diameter, the specific mechanical means not being shown, it being obvious to anyone skilled in the art. Member 11 contacts the upper convex surface of stud 4 between the weakened parts 9 and continues to move down to the position shown in Fig. 5. This force straightens the stud member to the shape shown in Fig. 6, forcing the concave ends 7 into intimate contact with the inner surfaces of sides 2 of link 1, the fins 3 fitting into the grooves 8. Because of the aforesaid dimension of the stud member which when straightened is slightly greater than the distance between the inner surfaces of the link sides, the link is bowed outwardly slightly opposite the ends of the stud as shown in Fig. 6.

The bowed stud member 4 under pressure of member 11 bends primarily at points 9 as the member 11 descends, thus greatly facilitating the movement of the ends 7 from position shown in Fig. 4 to position shown in Fig. 5. Thus they are moved into close contact with the sides of the link and cause the link to bow slightly. In this manner the stud member 4 is forced into position in the link. The fin members 3 fitting in the grooves 8 prevent any lateral displacement of the stud even should there be a loosening of the joint thus formed. The slight bowing of the link opposite the ends of the stud also tends to prevent any such lateral displacement and a fairly satisfactory stud link could be made without the fins on the inner surface of the link.

It is obvious that the projecting members 3 need not be of the shape shown for a link could be formed having a different form of opposing projections in which case the stud member would have its end surfaces shaped to fit around these projections but the method of forming the stud link would be the same.

While the drawings show only a single link formed into a stud link, in actual practice a chain of links would be made up first by means of any method such, for example, as is shown in the aforementioned patent to Taylor No. 2,144,319, and then each link of the chain treated as herein described to form a complete chain of stud links.

I claim:

1. Method of making a stud link comprising forming a link having opposing fin members on the inner surfaces of the sides of the link, forming a bowed stud member provided with a slot in each end and of slightly greater length when straightened than the distance between the inner sides of the link, supporting the link, positioning the bowed stud member across the link with the slots aligned with the fin members and exerting a pressing force against the center portion of the bowed stud member until the stud member is straightened.

2. Method of making a stud link by cold treatment comprising forming a link, forming a bowed stud member having end surfaces of a contour adapted to fit the contour of the opposing inner surfaces of the side portions of the link, said stud member being of greater length than the distance between the central side portions, supporting the link, positioning the stud member across the link with the end surfaces positioned to be moved into fit with the said inner side portions, and exerting a pressing force against the central portion of the bowed member until said stud member is substantially straightened, said end surfaces fitting securely against the inner sides of the link, the link being bowed slightly opposite the ends of the stud.

3. Method of making a stud link comprising forming a link having opposing projections on the inner surfaces of the sides of the link, forming a bowed stud member of slightly greater length than the distance between the inner surfaces of the sides of the link, the ends of the stud member being of a contour to fit around the projections on the sides of the link, supporting the link, positioning the stud member on and across the link with the ends positioned to be moved around the projections, applying a pressing force against the center of the bowed stud member until it is substantially straightened within the sides of the link, the ends fitting around the projections, the link being slightly bowed.

4. Method of making a stud link comprising forming a link, forming a stud member bowed from end to end so as to have an upper convex surface and a lower concave surface, the distance between the opposite ends adjacent the upper surface being greater than the distance between the inner sides of the link, the distance between the opposite ends adjacent the lower surface being less than the distance between the inner sides of the link, the end surfaces of the stud member being of a contour to fit the contour of the inner sides of the link, supporting the link, positioning the stud member across the link, the end portions adjacent the upper surface supporting it on the link, applying a pressing force against the central portion of the upper convex surface until the stud member is substantially straightened, the ends fitting around the inner sides of the link.

5. Method of making a stud link comprising forming a link having opposing projections on its inner sides, forming a bowed stud member having an upper convex surface and a lower concave surface, the surfaces of the ends of the stud member being of a contour to fit the projections and sides of the link, the distance between the ends of the stud adjacent the upper surface being greater than the distance between the inner sides of the link, the distance between the ends of the stud adjacent the lower surface being less than said distance, the portions of the stud between the ends and the center being formed of less than the distance between the inner sides of positioning the stud member across the link with the ends positioned to be moved around the projections, the portions of the end adjacent the upper surface supporting the link member on the link, supporting the link and applying a pressing force against the central upper surface of the stud member until the stud member is substantially straightened within the sides of the link.

6. Method of securing a bowed stud member to a chain link comprising positioning the stud member across the link when both are cold and supporting it by the sides of the link, supporting the link and applying a pressure to the central portion of the bowed stud member until the stud member is substantially straightened within the link.

7. Method of forming a stud link comprising supporting a plain link having opposing inner projections on its sides, positioning across and on said link a bowed stud member having its end surfaces shaped to fit the sides and projections of said link and being slightly longer than the distance between the sides of the link and applying a pressure to the central portion of the stud member until it is substantially straightened within the sides of the link, the link being slightly bowed at points opposite the ends of the stud due to the increased length of the stud.

8. Method of making a stud link comprising forming a link having substantially parallel side portions and connecting curved end portions, forming a stud member adapted to fit between the sides of the link, said stud member being bowed from end to end, the end surfaces being concave to form jaws adapted to fit the inner surfaces of the sides of the link, the distance between the upper parts of said jaws being greater than the distance between the inner sides of the link, the distance between the lower jaws being less than the distance between the inner sides of the link, portions of the stud member adjacent each end being formed of less cross section area than the other parts of the stud, supporting the link, positioning the stud member across the link the stud member being supported thereon by the upper parts of said jaws and applying pressure to the central bowed portion to bend the stud member so that the lower jaws are brought into contact with the sides of the link, the stud member is substantially straightened and the link is slightly bowed due to increased length of the stud member.

9. Method of securing a stud within a chain link comprising, forming a stud of greater length than the distance between the inner sides of the chain link and shaping the ends to fit the contour of the inner sides of the link, bowing the stud so that the ends can abut the inner sides of the chain link, supporting the link, positioning the stud across the link with the ends abutting the inner sides, applying pressure to the central portion of the bowed stud until it is substantially straightened within the link.

10. Method of securing a stud within a chain link comprising, forming a stud of greater length than the distance between the inner sides of the chain link and shaping the ends to fit the contour of the inner sides of the link, bowing the stud so that the ends can abut the inner sides of the chain link, weakening the stud adjacent each end to facilitate bending at those points, positioning the stud across the link with the ends abutting the inner sides and thus supporting the stud, supporting the link and applying pressure to the central part of the bowed stud to straighten it within the link and slightly bow the link.

PHILIP SCHNECK.